May 16, 1939.  R. M. ISHAM ET AL  2,158,582
TREATMENT OF GASEOUS HYDROCARBONS FOR THE PRODUCTION
OF LIQUID AROMATIC HYDROCARBONS
Filed Aug. 8, 1935
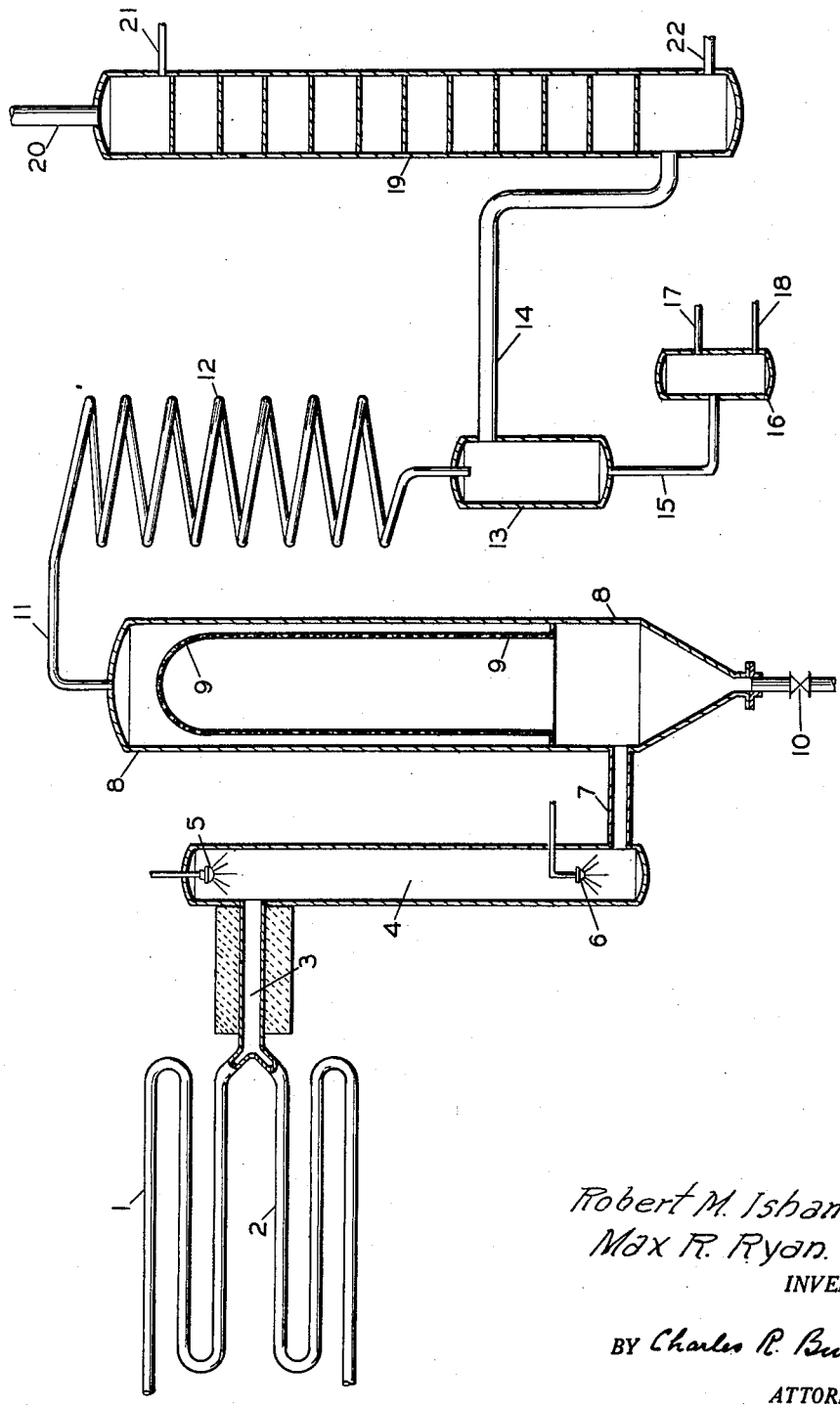
Robert M. Isham.
Max R. Ryan.
INVENTORS.
BY Charles R. Burke
ATTORNEY Patented May 16, 1939

2,158,582

UNITED STATES PATENT OFFICE 2,158,582

TREATMENT OF GASEOUS HYDROCARBONS FOR THE PRODUCTION OF LIQUID AROMATIC HYDROCARBONS

Robert M. Isham, Okmulgee, and Max R. Ryan, Tulsa, Okla., assignors to Danciger Oil & Refineries, Inc., Tulsa, Okla.

Application August 8, 1935, Serial No. 35,406

1 Claim. (Cl. 260—673)

As has long been known, the hydrocarbons present in such gases as coal gas, coke oven gas, natural gas, and other hydrocarbon bearing gases may be converted, in goodly proportion, into acetylene, by a high temperature heat treatment, such as passage through the electric arc, or partial combustion at high temperature, or the like. Temperatures in excess of 2000° F. are necessary to obtain good yields of acetylene, although some acetylene may be formed at much lower temperatures.

It is also well known that at an appropriate temperature, say 1000° F. to 1200° F., acetylene polymerizes rapidly to benzol and other normally liquid aromatic hydrocarbons.

Therefore, it is possible to convert normally gaseous hydrocarbons to normally liquid aromatic hydrocarbons by subjecting the gaseous hydrocarbons to a primary heat treatment at high temperature in which acetylene is formed, and then subjecting the acetylene containing gas to a secondary heat treatment at a relatively low temperature, such as is favorable to the above described polymerization. However, as is well known, acetylene decomposes rapidly into its elements at temperatures much above 1200° F., and in consequence, it is essential to secure a very rapid reduction in temperature between the first and second heat treatments.

We have discovered that this instantaneous reduction in temperature may advantageously be obtained by introducing a properly regulated proportion of water into the hot gases leaving the primary heating zone. This water may be introduced either as liquid or as steam, although we prefer to introduce it as a spray of liquid, taking advantage of its high latent heat of vaporization to secure instantaneous cooling to the correct temperature for polymerization of acetylene. The water is vaporized, producing a mixture of gas and steam.

At high temperatures steam reacts with acetylene and other hydrocarbon gases, with formation of carbon monoxide, carbon dioxide and hydrogen. However, we have found that if the quantity of water introduced is sufficient to secure instantaneous reduction of the temperature to about 1200° F., or below, there is very little reaction between the steam and acetylene.

At temperatures of about 1000° F. to 1200° F. the polymerization of acetylene to normally liquid aromatic hydrocarbons proceeds smoothly, and is not prevented by the presence of the steam, which results from the vaporization of the water.

During the primary, or high temperature heat treatment, more or less free carbon is produced from the hydrocarbons. This free carbon is swept into and through the zone of the second heat treatment, in which polymerization of acetylene occurs. In consequence, the products leaving the zone of the second heat treatment consist of a mixture of gases, steam and vapors of aromatic hydrocarbons, carrying in suspension more or less finely divided carbon, or carbon black. By appropriate treatment, by known methods, these are separated from one another. For instance, the mixture may be further cooled by passing through a cooling coil, or by a further introduction of water, which becomes vaporized, and the carbon may then be separated by electrical precipitation or by use of bag type filters. Thereafter, by further cooling, the bulk of the steam and portions of the aromatic hydrocarbons may be condensed and the condensed liquids separated from the gas and from one another, and finally the gas may be passed through a bubble tray absorber where it is subjected to counter current washing with a high boiling hydrocarbon oil, such as mineral seal oil, for recovery of any aromatic hydrocarbons which are still present as vapors in the gas. These aromatic hydrocarbons are separated from the high boiling hydrocarbon oil by distillation in the known manner, the high boiling hydrocarbon oil being then cooled and returned cyclically to the bubble tray absorber. The gas may thereafter be used as fuel, although its calorific value is low, or in some cases all, or a portion of it, may be mixed with the hydrocarbon gas which is to be subjected to treatment.

In a typical embodiment of our process, represented more or less diagrammatically by the accompanying drawing, natural gas, pre-heated to 1200° F. in the coil 1, is subjected to partial combustion with air, which has been pre-heated to 1800° F. in the coil 2, in a combustion chamber 3, formed of refractory brick. The gas and air is supplied in a ratio of 1 to 3, and a temperature of 2450° F. is obtained in the combustion chamber 3.

At the instant of its passage from the combustion chamber 3, into the polymerizing chamber 4, the gas is suddenly cooled by the introduction of a spray of water through the spray nozzle 5, the proportion of water being so regulated that a temperature of 1100° F. prevails in the polymerizing chamber.

The chamber 4 is so proportioned that the mixture of gas and steam requires approximately 15 seconds to pass down to the lower portion of the chamber and reach the spray nozzle 6. This time interval permits almost complete polymerization of the acetylene to aromatic hydrocarbons.

On reaching the spray nozzle 6, the gas is further cooled to approximately 200° F. by the introduction of a second regulated proportion of water.

The mixture of gas, steam and hydrocarbon vapor, together with finely divided carbon which has been produced in the zone of partial combustion, next pass through the pipe 7, into the vessel 8, which is provided with an asbestos filter bag 9, for the collection of the carbon, which is periodically shaken down into the hopper bottom of the vessel 8, and removed through the butterfly valve 10.

The gaseous and vaporous reaction products, freed of carbon by the filter bag 9, pass out of the vessel 8, through the line 11, into the condenser 12, where they are cooled to a temperature of 80° F. to 90° F. The bulk of the steam and part of the aromatic hydrocarbons are condensed in this condenser, and the resulting liquids are separated from the gas in the separator 13, flowing off through the line 15 to the continuous decanter 16, in which the aromatic hydrocarbons are separated from the water. The water is run off through the pipe 18, and the aromatic hydrocarbons through the pipe 17, which is connected with the hydrocarbon storage tank (not shown).

The gas, which passes out of the separator 13, by the pipe 14, still contains about ⅔ of a gallon of aromatic hydrocarbons, in the form of vapor, per 1000 cubic feet of gas. These vapors are removed from the gas by passing the gas up through the bubble tray absorber 19, where it is subjected to counter current washing by a stream of mineral seal oil, introduced on the top tray of the absorber through the line 21, and which flows down over the trays of the absorber and out through the line 22. The gas, leaving the absorber through the line 20, is substantially free of the vapors of aromatic hydrocarbons, and contains only small amounts of acetylene.

The mineral seal oil, drawn from the absorber through the line 22, passes to a heat exchanger and still (not shown) where it is freed of dissolved aromatic hydrocarbons, which are distilled off and run to the hydrocarbon storage tank. The mineral seal oil, after cooling, is returned cyclically to the bubble tray absorber.

The bulk of the aromatic hydrocarbon material manufactured in this manner is of the boiling range of motor fuel, and is of very high octane value. Its Baumé gravity is in the neighborhood of 30°, and the yield is about 3 gallons per 1000 cubic feet of natural gas processed.

It will be understood that we do not limit ourselves to the use of partial combustion as the method employed in the first heat treatment, in which acetylene is formed. Any other method of high temperature heat treatment may be employed, such as passage of the hydrocarbon containing gas which is being treated through an electric arc, or through a pre-heated refractory checker work, or the like.

Neither do we limit ourselves to the particular method of treatment employed in the example for the separation of the carbon or for the recovery of the aromatic hydrocarbons, as any of the known methods may be employed without departing from the scope of our invention.

Having described our process, what we claim as novel is covered by the following claim:

A continuous process for the conversion of normally gaseous hydrocarbons to normally liquid aromatic hydrocarbons which consists in subjecting a stream of gaseous hydrocarbons to partial combustion with preheated air to attain a temperature of at least 2000° F., to convert a portion of the gaseous hydrocarbons into acetylene, passing the highly heated stream to a zone where its temperature is instantaneously reduced to a temperature of 1000° F. to 1200° F. by the introduction of a properly regulated proportion of water to prevent an overreaction of the acetylene, regulating the flow of the mixture of gas and steam formed through said zone so as to subject said mixture to said reduced temperature for a time interval which will permit a substantially complete polymerization of the acetylene to form vapors of aromatic hydrocarbons, the proportion of water added in said zone being sufficient to prevent a destructive reaction between the acetylene and said steam during the passage of said mixture through said zone, and thereafter further cooling the mixture and separating gas, water, aromatic hydrocarbons and free carbon from one another.

ROBERT M. ISHAM.
MAX R. RYAN.